United States Patent
Powell

[11] 3,787,780
[45] Jan. 22, 1974

[54] ELECTRON TUBE HAVING INTERNAL GLASS MEMBER COATED WITH CRYSTALLINE CERAMIC MATERIAL

[75] Inventor: John Arthur Powell, Lancaster, Pa.
[73] Assignee: RCA Corporation, New York, N.Y.
[22] Filed: July 24, 1972
[21] Appl. No.: 274,639

[52] U.S. Cl. ............... 331/94.5, 330/4.3, 65/33, 313/220, 313/221, 313/317
[51] Int. Cl. ................ H01s 3/02, H01s 3/22
[58] Field of Search ......... 331/94.5; 330/4.3; 65/33; 313/220, 221, 317

[56] References Cited
UNITED STATES PATENTS
2,568,459  9/1951  Noel ........................... 313/221 X
3,298,553  1/1967  Lusher ........................ 65/33 X OTHER PUBLICATIONS
Hernquist, RCA Review, Vol. 30, No. 9, Sept. 1969, pp. 429–431.

*Primary Examiner*—Ronald L. Wibert
*Assistant Examiner*—R. J. Webster
*Attorney, Agent, or Firm*—G. H. Bruestle; LeRoy Greenspan; I. M. Krittman

[57] ABSTRACT

An electron tube comprising a gas-tight envelope containing an anode, a cathode and an elongated glass member which normally deforms when heated to about 450°C for 16 hours. A continuous layer of crystalline ceramic material is fused to a substantial portion of the surface of the elongated member to substantially reduce the deformation.

8 Claims, 4 Drawing Figures

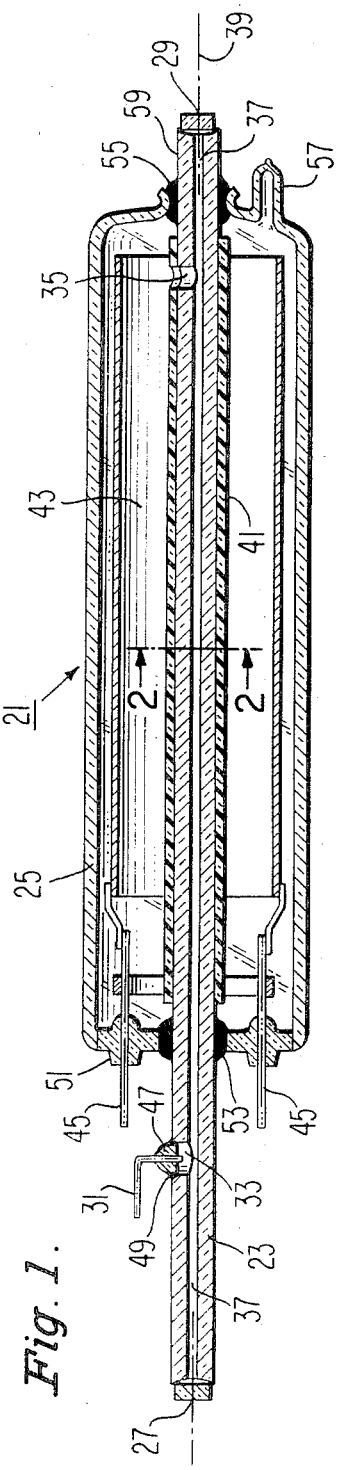
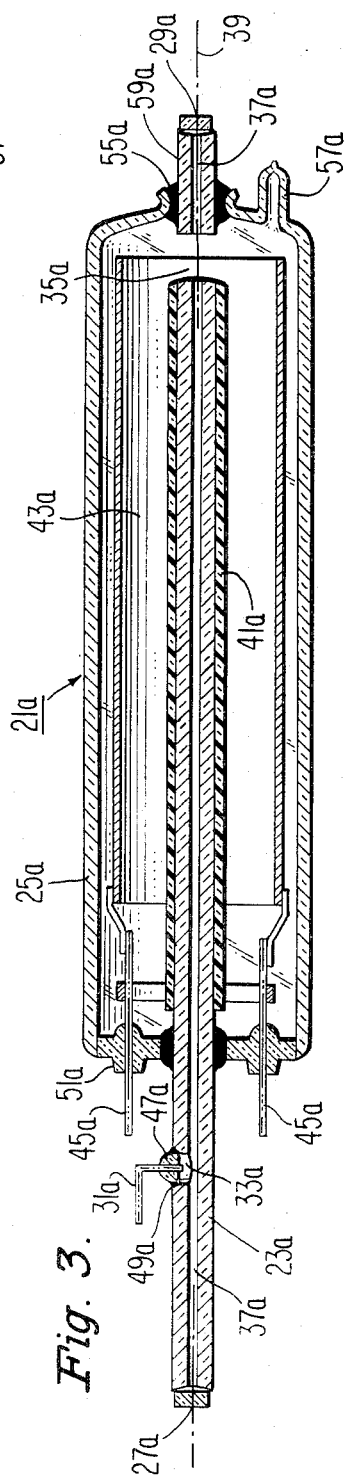
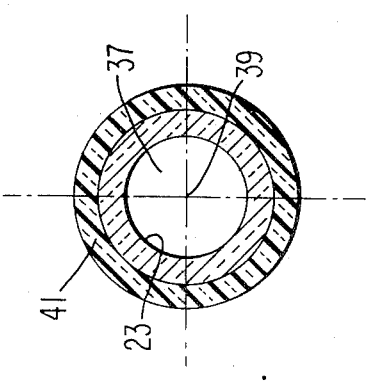
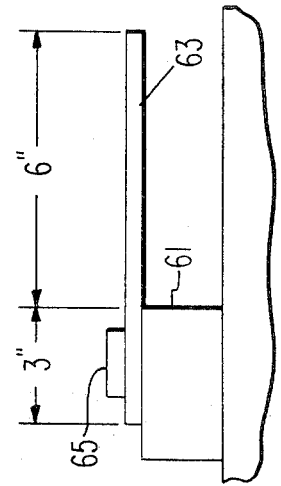

ELECTRON TUBE HAVING INTERNAL GLASS MEMBER COATED WITH CRYSTALLINE CERAMIC MATERIAL

BACKGROUND OF THE INVENTION

This invention relates to a novel electron tube and particularly, but not exclusively, to an improved gas laser tube.

An electron tube, which is the generic name for a class of devices that includes vacuum tubes and gas-filled tubes, comprises a gas-tight envelope and a cathode and an anode within the envelope. When low material and fabrication costs are desired, the envelope and other members of the tube are made of soft glass. While soft glass has many desirable properties, it has the disadvantage that it is more easily deformed during fabrication of the tube because the working temperatures and the softening temperatures of soft glasses are closer to one another than those of hard glasses and other types of glass.

In some types of tubes, deformation is critically important. For example, in one type of gas laser tube, the envelope is comprised of a glass capillary bore tube which extends through and is sealed to a glass jacket. Optical elements close the opposite ends of the tube. During the operation of the tube, an active gas within the bore is stimulated to emit light, which is transmitted through one or both optical elements in the form of a laser beam. The bore of the capillary bore tube must be made straight and must remain straight during operation in order to realize the highest efficiency from the tube. The efficiency is reduced to the extent that the bore has sagged, deflected, or otherwise varies from a straight bore. In the extreme cases, no laser beam is produced.

The term "creep" as used herein is the gradual plastic deformation of a glass member, usually, but not necessarily, at elevated temperatures, when it is subjected to a relatively low stress. That stress may be produced in the member by its own weight acting against its support or supports, and/or may result from interaction of the member with other members, due, for example, to changes in temperature or other conditions of operation. It is desirable to reduce "creep" or deformation occurring during the fabrication of the device and/or during the operation of the device.

SUMMARY OF THE INVENTION

The novel electron tube comprises a cathode, an anode, a gas-tight envelope surrounding said anode and cathode, an elongated glass member within the envelope, which member normally exhibits "creep" when heated to about 450°C for 16 hours, and a continuous layer of crystalline ceramic material fused to a substantial portion of the surface of the glass member. The layer has a thickness sufficient to reduce the "creep" in the glass member by at least 30 percent. Because of its crystalline nature, the layer behaves like a rigid sheath on the glass member, which is able to redistribute applied stress so that "creep" or deformation of the glass member is substantially reduced.

BRIEF DESCRIPTION OF THE DRAWING

FIG. 1 is a sectional view of a first embodiment of the invention in the form of a gas laser tube employing a capillary bore tube supported at both ends thereof.

FIG. 2 is an enlarged sectional view of the capillary bore tube of the device of FIG. 1 along section line 2—2.

FIG. 3 is a sectional view of a second embodiment of the invention in the form of a gas laser tube employing a cantilevered capillary bore tube.

FIG. 4 is an elevational view of a test setup for determining "creep" in an elongated glass member.

Similar reference numerals are used for similar structures throughout the drawings.

DETAILED DESCRIPTION OF THE PREFERRED EMBODIMENTS

Example 1 - FIG. 1 shows a gas laser tube comprised of a gas-tight envelope 21 including a straight capillary bore tube 23 passing through and sealed to a jacket 25 and a pair of optical elements 27 and 29 sealed to and closing the ends of the bore tube 23. The capillary bore tube 23 and the jacket 25 are of a lead-soda-potash soft glass, for example, a No. 0120 glass. An anode in the form of a metal pin 31 is sealed into a first port 33 in the wall of the capillary bore tube 23 between the jacket 25 and the one optical element 27. A second port 35 in the wall of the capillary bore tube 23 within the jacket 25 permits access of gas between the bore 37 and the space between the bore tube 23 and the jacket 25. The combination of the bore 37 and the optical elements 27 and 29 in the arrangement shown provides a resonant cavity for laser operation. The internal surface of one of the optical elements 27 is about 99 percent reflecting and about one percent transmitting of the wavelengths of the laser beam. The internal surface of the other optical element 29 is about 99.9 percent reflecting and about 0.1 percent transmitting. The bore 37 is straight and circular over its entire length and is centered as nearly as possible around an axis 39. To maintain the linearity of the bore and to reduce or prevent creep, there is provided on the outer surface of the capillary bore tube 23 within the jacket 25 a layer 41 of crystalline ceramic material as shown in greater detail in FIG. 2. In this example, the layer 41 is of a devitrified solder glass about three mils thick.

A cylindrical cathode 43 is located in coaxial relationship between the bore tube 23 and the jacket 25. The cathode 43 is typically of an aluminum alloy having its surfaces oxidized to aluminum oxide. The cathode 43 is electrically connected to stem leads 45. The envelope is filled with a mixture of helium and neon gases.

The device shown in FIGS. 1 and 2 may be fabricated by the following procedure. Provide a capillary bore tube 23 having a 300 mil outside diameter and a 60 mil inside diameter and having first and second ports 33 and 35 located therein. Apply to the desired surfaces a layer of devitrifying solder glass such as CV-135, marketed by Owens-Illinois Glass Company, Pittsburgh, Penna. Insert into the first port 33 a washer-shaped preform of sealing glass and the metal pin 31 embedded in and extending through a glass bead 47. Mount the bore tube 23 on a straight mandrel (not shown) and heat the tube to about 450°C for about one hour. The surface coating melts and then devitrifies, producing thereon a crystalline ceramic layer 41 about 0.003-inch thick. The sealing glass preform melts, forming a seal 49 between the glass bead 47 and the wall of the first port 33. Stem leads 45 are assembled and sealed into a stem base 51. The cathode 43 is mounted on the contact pins 45 in the stem base 51. Then, the bulb section of the jacket 25 is sealed to the stem base.

Next, a straight mandrel (not shown) is slid into the bore of a bore tube 23. The cathode and jacket assembly and two ring-shaped preforms of devitrifying solder glass are slid on the bore tube 23 and positioned as desired. The entire assembly is heated to about 450°C for about one hour until the two preforms melt and devitrify, producing the two jacket-to-bore tube seals 53 and 55. The mandrel is removed, and the optical elements 27 and 29 are now sealed to the ends of the bore tube 23 with a low-vapor-pressure epoxy sealant. The optical elements 27 and 29 may be sealed to the bore tube by the method disclosed in U.S. Pat. No. 3,390,351 issued June 25, 1968 to W. E. Bell, for example. In order to permit final simplified orientation of the optical elements 27 and 29 in their required relationship for a resonant cavity, the ends of the bore tube 23 are ground to a concave contour so that the optical element assumes a different angle on the end, such as with respect to the axis 39, for each different location. After the optical elements are sealed, the tube is baked to remove residual gases adsorbed to the surface thereof and then filled with a mixture of about 10 percent neon and 90 percent helium to 3.3 torr pressure through a tubulation 57, which is then sealed.

To operate the tube 21, an electric discharge current of about 5 milliamperes DC is maintained at a voltage of about 1500 volts between the anode pin 31 and the stem leads 45. The helium-neon gas mixture within the bore tube becomes excited, emitting its characteristic radiation which is reflected by the optical elements 27 and 29 producing stimulated coherent light emission. A portion of the coherent light is transmitted by one or both of the optical elements as an output laser beam or beams.

Example 2 - The tube shown in FIG. 3 is similar in all respects to the tube described in Example 1, except that instead of a second port 35, the capillary bore tube 23a is discontinuous. The portion of the bore tube nearest the stem end is cantilever supported by the stem base 51a and extends almost to the other end of the jacket. After the discontinuity, the bore tube 23a continues as a stub glass bore tube 59a. The cantilevered portion of the bore tube 23a presents a more severe problem in resisting creep due to its own weight. However, the discontinuous characteristic of the bore tube 23a reduces the amount of creep resulting from strain produced by temperature differentials between the capillary bore tube 23a and the jacket 25a. The ceramic layer 41a is effective in reducing substantially the creep in different structural elements.

GENERAL CONSIDERATIONS AND ALTERNATIVES

The invention has been described with respect to gas laser tubes. However, the invention may be applied to other electron tubes that comprise elongated glass members which creep or deform when subjected to relatively low stress. The glass member may be of a hard glass, such as a borosilicate glass; a soft glass, such as a soda-potash or soda-lime glass with or without lead content; a high silica glass; an alumino-silicate glass; etc. At present, it is believed that the invention will find greater commercial use with members made of soft glass. Where the elongated member is a capillary bore tube, the outside diameter may be 250 to 450 mils, and the inside diameter may be 15 to 100 mils and preferably 30 to 80 mils.

The elongated glass member carries a layer of crystalline ceramic material fused to a substantial portion of a surface of the elongated member. The surface may be external or internal, as in the case of tubing. By "crystalline ceramic material" is meant materials in which the crystal content by volume is at least 50 percent. Crystalline ceramic materials include high alumina ceramics and zirconia ceramics, which are at least 85 percent crystalline. It is believed that the higher the crystal content, the greater will be the rigidity of the member, for the reason that more crystals are in contact with one another, thereby providing a stronger, more rigid skeleton or matrix.

The layer of crystalline ceramic material is preferably fused or otherwise bonded to the surface of the elongated glass member. This may be achieved by applying to the surface of the member at room temperature a coating of particles of crystalline material and a binder glass or frit, and then heating the coated member to melt the binder glass and adhere the particles of crystalline material to the surface of the member. In the preferred method, a coating of particles of devitrifying solder glass or frit is applied to the surface of the member and then heated to melt the coating and then to devitrify the molten material. By the preferred method, the crystalline content of the layer is normally between 60 and 90 percent by volume of the layer.

The layer of crystalline ceramic material should have a sufficient thickness to reduce the creep in the member by at least 30 percent. For the usual glass members used in electron tubes, this thickness is about 1 to 20 mils. Generally, the thicker the layer within this range, the greater will be the resistance to creep.

The following test was used to measure the creep in elongated glass members. Tubing of the glass member material, about 0.275 inch in diameter and 0.325 inch in diameter, was cut to lengths of about nine inches to provide test members. Then a coating of a devitrifying solder glass frit, such as Owens-Illinois No. C-V-135 solder glass frit in a nitrocellulose-amyl acetate solution, was painted on the outer surface of the test members by hand. After drying, the members were placed in an air furnace in an upright position and heated at about 440°C for about 1.0 hour and then cooled. The coated test members at this point had a translucent, buff-colored layer fused to their surfaces. Then, using the test assembly shown in FIG. 4, at least one member 63 of each diameter with a coating layer and at least one member of each diameter without a coating layer are placed on a block 61 with a weight 65 on top so that members 63 extend as cantilevers, six inches beyond the block 61 and about three inches on the block 61. The test assembly is placed in an air furnace and heated at about 450°C for about 16 hours and then cooled to room temperature. The test members 63 are removed from the test assembly, and the amount of creep is measured.

One test of one coated and one uncoated tube of No. 0120 glass in each of the above diameters tested in this manner yielded the following data:

| Member | Diameter | Coating | Creep |
|---|---|---|---|
| 1 | 0.275 | yes | 0.01 |
| 2 | 0.275 | no | 0.17 |
| 3 | 0.325 | yes | 0.01 |
| 4 | 0.325 | no | 0.12 |

The crystalline ceramic layers or coatings were about two mils (0.002 inch) thick.

It is well known that proper glaze fit (whereby the glaze is in compression at room temperature) may markedly improve the mechanical strength of a glazed ceramic member, and some combination of a compressive ceramic layer on the glass member should improve the strength of the member. Some commercially available products which may be matched for coefficients of expansion are as follows: Owens-Illinois devitrifying frit No., CV-135 can be used with No. 0120, No. 0010, and No. 0080 glasses; Corning No. 89 and No. 95 devitrifying solder glasses may also be used with these glasses; Corning No. 45 devitrifying frit may be used with alumino-silicate glasses No. 1720 and No. 1723.

The devitrifying frit coating may be applied to the elongated glass member by any one of several conventional techniques including spraying, dipping, rolling, silk screening, and brushing. Upon drying, the coated member is heated or fired to the maturing temperature of the coating, which is normally near the annealing temperature of the glass. During the heating operation, the coating melts and forms a glass, and almost immediately begins to devitrify into a ceramic coating that is fused to the glass member. Upon cooling, the coated glass article is ready for use, or for recoating if a heavier coating is desired. Since most solder glass coating materials are also bondable to certain metals or their adherent oxides, metal parts can be attached to the glass member at the same time as the heating step is carried out. Hermetic or vacuum-type seals can be made in this manner.

I claim:

1. An electron tube comprising a cathode, an anode, a gas-tight envelope surrounding said cathode and anode, an elongated glass member within said envelope, which glass member normally deforms when heated to about 450°C for 16 hours, and a continuous layer of crystalline ceramic material fused to a substantial portion of the surface of said member to substantially reduce said deformation in said glass member.

2. The tube defined in claim 1 wherein said envelope is constituted of soft glass.

3. The tube defined in claim 1 wherein said member is a capillary bore tube having a cathode and an anode operatively connected near the ends thereof.

4. The tube defined in claim 3 wherein said capillary bore tube is connected to said envelope at one end thereof in a cantilever fashion.

5. The tube defined in claim 3 wherein said capillary bore tube is connected to said envelope at both ends thereof.

6. A gas laser tube comprising at least one bore tube of soft glass and having a lineal bore therethrough which is substantially centered around an axis through said bore; a gas within said bore; means for creating a discharge through said bore to induce a population inversion in said gas, said means including an anode disposed near one end of said bore tube and a cathode around said axis and coextensive with respect to said bore tube over a substantial portion of their respective lengths; a soft glass jacket surrounding said cathode, said jacket being sealed to said bore tube near at least one end of said bore tube; and a continuous layer of crystalline ceramic material fused to the extended surface of said bore tube over a substantial portion thereof within said jacket.

7. The gas laser tube defined in claim 6 wherein said crystalline ceramic material is a devitrified solder glass.

8. The gas laser tube defined in claim 7 wherein said continuous layer extends over substantially the entire external surface of said bore tube.

* * * * *